United States Patent
Watanabe et al.

(10) Patent No.: US 10,377,059 B2
(45) Date of Patent: Aug. 13, 2019

(54) APPARATUS FOR TAKING OUT MOLDED PRODUCT

(71) Applicant: Yushin Precision Equipment Co., Ltd., Kyoto (JP)

(72) Inventors: Fumitake Watanabe, Kyoto (JP); Atsushi Shirasaki, Kyoto (JP); Koji Tachibana, Kyoto (JP)

(73) Assignee: YUSHIN PRECISION EQUIPMENT CO., LTD., Kyoto (JP)

( * ) Notice: Subject to any disclaimer, the term of this patent is extended or adjusted under 35 U.S.C. 154(b) by 108 days.

(21) Appl. No.: 15/678,649

(22) Filed: Aug. 16, 2017

(65) Prior Publication Data

US 2018/0050470 A1    Feb. 22, 2018

(30) Foreign Application Priority Data

Aug. 18, 2016 (JP) .................. 2016-160794
Jun. 7, 2017 (JP) .................. 2017-112975

(51) Int. Cl.
*B29C 33/44* (2006.01)
*G05B 5/01* (2006.01)
(Continued)

(52) U.S. Cl.
CPC ........... *B29C 33/442* (2013.01); *B25J 9/1638* (2013.01); *B25J 13/088* (2013.01); *B29C 45/42* (2013.01); *B29C 45/7626* (2013.01); *G05B 5/01* (2013.01); *B25J 13/087* (2013.01); *B29C 45/40* (2013.01); *B29C 45/4225* (2013.01); *B29C 2045/1792* (2013.01); *B29C 2045/1793* (2013.01); *B29C 2045/4073* (2013.01);
(Continued)

(58) Field of Classification Search
CPC .... B29C 2045/1792; B29C 2045/1793; B29C 2045/4073; B29C 2045/4266; B29C 2045/7633; B29C 45/40; B29C 45/42; B29C 45/4225; B29C 45/7626; B29C 33/442; B25J 13/087; B25J 13/088; B25J 9/1638
USPC ......................................................... 425/139
See application file for complete search history.

(56) References Cited

U.S. PATENT DOCUMENTS

2012/0217108 A1 * 8/2012 Muragishi ............ F16F 7/1005
188/379

FOREIGN PATENT DOCUMENTS

EP          1063072 A1 * 12/2000  ......... B29C 45/7626
JP       2004-218818       8/2004
(Continued)

OTHER PUBLICATIONS

Irish Search Report dated Jul. 13, 2018, 5 pages.

*Primary Examiner* — Joseph S Del Sole
*Assistant Examiner* — Lawrence D. Hohenbrink, Jr.
(74) *Attorney, Agent, or Firm* — Rankin, Hill & Clark LLP

(57) ABSTRACT

An apparatus for taking out a molded product that is capable of suppressing displacement vibration of an attachment in a shorter time than ever without using a large-scaled electric actuator. An active controller performs active control in conjunction with the positioning, control by the servomotor. At the beginning of the active control, the positioning control is primarily performed by the servomotor, and then the active control is positively performed by the active controller using an electric actuator. Compared with when only the active control is performed for vibration suppression, a lighter and smaller electric actuator can be employed.

27 Claims, 12 Drawing Sheets

(51) Int. Cl.
    *B25J 9/16*           (2006.01)
    *B25J 13/08*         (2006.01)
    *B29C 45/42*         (2006.01)
    *B29C 45/76*         (2006.01)
    *B29C 45/17*         (2006.01)
    *B29C 45/40*         (2006.01)

(52) U.S. Cl.
    CPC ................. *B29C 2045/4266* (2013.01); *B29C 2045/7633* (2013.01); *B29C 2945/76317* (2013.01); *B29C 2945/76421* (2013.01); *B29C 2945/76795* (2013.01); *B29C 2945/76899* (2013.01)

(56) References Cited

FOREIGN PATENT DOCUMENTS

| | | |
|---|---|---|
| JP | 2004-223798 | 8/2004 |
| JP | 2004-249629 | 9/2004 |
| JP | 2007-136975 | 6/2007 |
| JP | 2010-111012 | 5/2010 |
| JP | 2017-105190 | 6/2017 |

\* cited by examiner

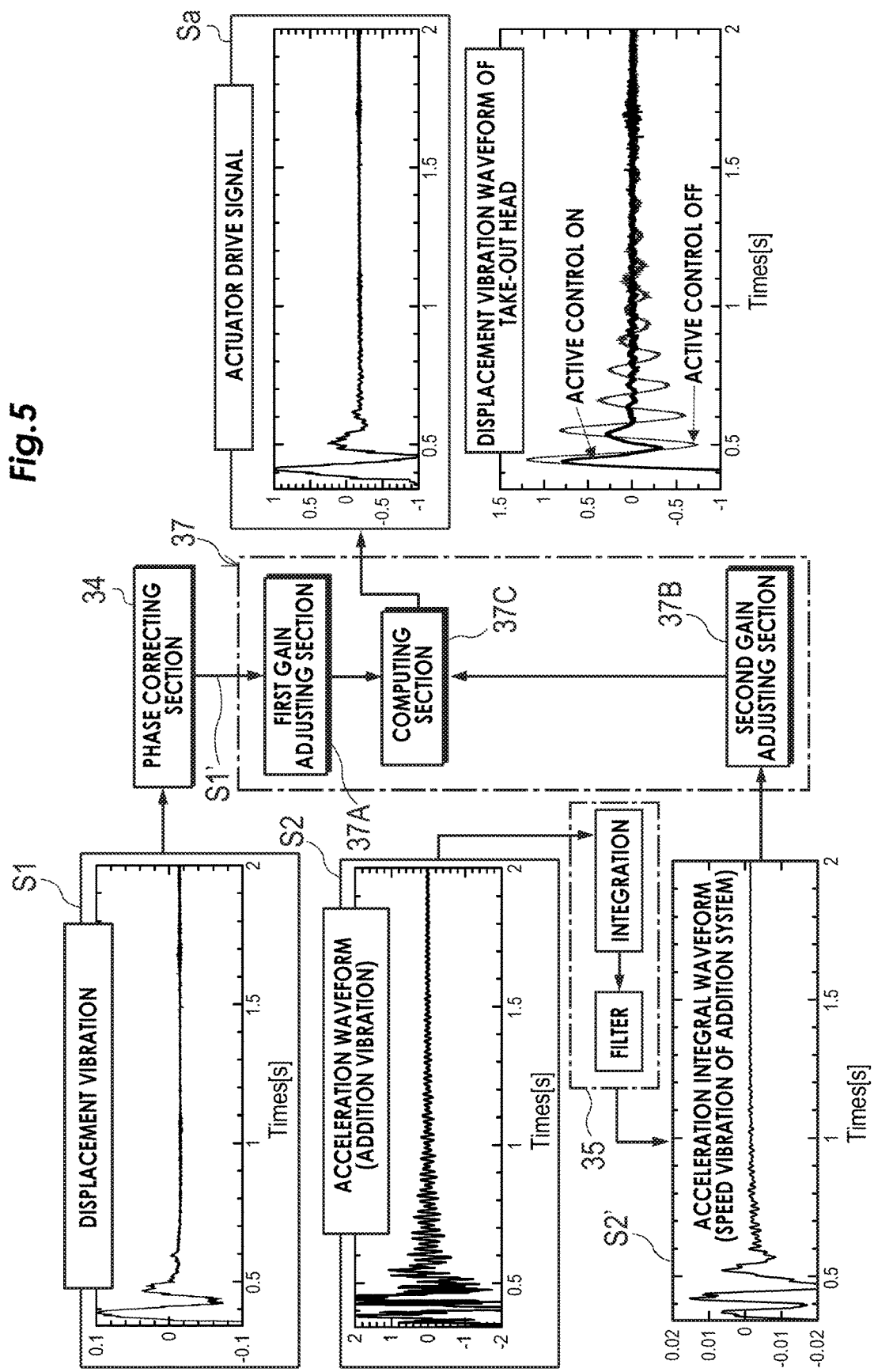

APPARATUS FOR TAKING OUT MOLDED PRODUCT

TECHNICAL FIELD

The present invention relates to an apparatus for taking out a molded product that is capable of reducing a displacement vibration of a take-out head in a short time.

BACKGROUND ART

JP 2010-111012 A discloses an apparatus for taking out a molded product. The apparatus is provided with a take-out head (a section operable to take out a molded product) driven by a drive source to take out a molded product from a molding machine. The apparatus includes a table to which a vibration component of the take-out head is inputted, and control means for controlling the moving speed of the take-out head to suppress a displacement vibration of the take-out head by driving a servomotor (drive source) by feedforward control using the table, thereby suppressing the vibration of the take-out head.

JP 2004-223798 A discloses a vibration suppressing system for an apparatus for taking out a molded product. The apparatus is operable to control the movement of a chuck for holding a molded product between predetermined positions to take out the molded product from a resin molding machine. At least one of the chuck and a mover for moving the chuck is provided with a dynamic vibration absorbing device operable to generate vibration for negating the residual vibration of the mover when the movement of the chuck is stopped. The dynamic vibration absorbing device has a fluid sealed in a container such that the fluid can flow therein, and vibrates the fluid and converges the vibration at an attenuation rate according to the viscosity of the fluid.

SUMMARY OF INVENTION

Technical Problem

In an apparatus for taking out a molded product in which a take-out head (attachment) is attached to a leading end of a lift frame mounted to a movable base which is provided at a pull-out frame to be driven by a servomotor, a displacement vibration occurs at the attachment even after the servomotor has completed positioning control. In the prior art as is disclosed in JP 2010-111012 A, it takes long time to suppress the displacement vibration. To solve this problem, vibration suppression control may also be employed in addition to the function of positioning control of a servo device. It is difficult, however, to set conditions for the vibration suppression control.

In the prior art as is disclosed in JP 2004-223798 A, it is necessary to separately provide a dynamic vibration absorbing device that utilizes the viscosity of a fluid capable of generating an appropriate resonant vibration according to varied take-out conditions. Such dynamic absorbing device is only usable in particular conditions, lacking versatility. As an alternative solution, an electric actuator may be used as a dynamic vibration absorbing device. In order to absorb all of the displacement vibrations, a large-scaled and heavy electric actuator is required. It is not practical to mount such large-scaled electric actuator onto the take-out head.

Accordingly, an object of the present invention is to provide an apparatus for taking out a molded product that is capable of suppressing a displacement vibration of an attachment in a shorter time than ever by using active control.

Another object of the present invention is to provide an apparatus for taking out a molded product that is capable of suppressing a displacement vibration of an attachment in a shorter time than ever by performing active control in conjunction with various vibration suppression functions of a positioning servo device using a servomotor.

Solution to Problems

An apparatus for taking out a molded product, which the present invention aims at improving, includes a positioning servo device using a servomotor and an approach frame controlled by the positioning servo device and having an attachment mounted thereon. A servomotor to be used may be an AC servomotor, a DC servomotor, or a motor of any other types, provided that the motor is capable of performing servo control. The attachment refers to a take-out head, a cutter or the like that is used for taking out a molded product. The apparatus of the present invention includes a displacement vibration detector operable to detect a displacement vibration of the attachment, and an active controller including an electric actuator and configured to perform active control to suppress a displacement vibration of the attachment by causing the electric actuator to apply to the attachment a vibration having an antiphase to the displacement vibration detected by the displacement vibration detector. The active controller performs the active control in conjunction with at least the positioning control by the positioning servo device. According to the present invention, since at least the positioning control by the positioning servo device is performed in conjunction with the active control by the active controller, the displacement vibration of the attachment can be suppressed in a shorter time than ever. If the positioning control by the positioning servo device and the active control by the active controller are jointly used, compared with the vibration suppression only by the active control, it is possible to use an electric actuator that is smaller in size and lighter in weight.

In many cases where a belt transport mechanism or a rope transport mechanism that is driven by a servomotor is used, displacement vibration of the attachment cannot be suppressed in a short time only by means of positioning control by the servomotor. Then, an idea of using an active controller has come up. In active control using a dynamic vibration absorbing device that utilizes the viscosity of a fluid as disclosed in JP 2004-223798 A, it is difficult to control the start time of active control or a point of time of staring active control, and furthermore it becomes unable to perform appropriate vibration suppression control merely due to a change in weight and the center of gravity of a molded product. Then, in the present invention, the active control is performed to suppress the displacement vibration of the attachment by causing the electric actuator to apply to the attachment a vibration having an antiphase to the displacement vibration detected by the displacement vibration detector.

When jointly using the positioning control by the servomotor and the active control by the active controller for vibration suppression, if an output of the electric actuator is small, it is not necessary to control the magnitude of an output of the electric actuator. However, when an output of the electric actuator becomes large, if consideration is not given to the weight and the installation location of the electric actuator, the active control may hinder the positioning control by the servomotor and/or the displacement vibration may temporarily become large, thereby failing to shorten the time required for vibration suppression. In case these issues should be expected, the active controller is preferably configured to perform limited active control with an output lower than the maximum output of the electric actuator until the amplitude of displacement vibration of the attachment is attenuated to a predetermined setting or set magnitude or the amplitude can be considered as having been attenuated to the predetermined setting or set magnitude. In this configuration, since the active control is started together with the positioning control by the servomotor, vibration suppression control can smoothly be transferred from the positioning control by the servomotor to the active control by the active controller. As a result, it becomes possible to smoothly suppress the displacement vibration of the attachment in a shorter time than ever. The output lower than the maximum output is preferably determined not to adversely affect the positioning control by the servomotor. For this reason, the active controller is preferably configured to increase the output of the electric actuator gradually or stepwisely from the lower output. This can prevent adverse effect from being given to the vibration suppression at the beginning phase of the active control.

As described above, if the limited active control is performed with an lower output than the maximum output of the electric actuator until the amplitude of displacement vibration of the attachment is attenuated to the predetermined setting or the amplitude can be considered as having been attenuated to the predetermined setting, vibration suppression by the active control using the electric actuator is positively performed from the time that the electric actuator can demonstrate its capacity. Therefore, an electric actuator, which is light in weight and small in size, can be used for vibration suppression, thereby enabling the active control using an electric actuator to be practically applied to an apparatus for taking out a molded product. An electric actuator, which is light in weight and small in size, can be attached to the attachment itself or other portion of the approach frame.

The present invention may be applied for the purpose of suppressing displacement vibrations not only in one axial direction but also in two or more axial directions. To suppress the displacement vibrations in two or more axial directions, an electric actuator may be provided in each axial direction to suppress a displacement vibration in the corresponding axial direction by means of active control.

The active control is applicable not only when the positioning servo device performs positioning control alone but also when the positioning servo device performs positioning control along with vibration suppression control, or along with jerk control, or along with both vibration suppression control and jerk control.

Specifically, the active controller may determine whether or not the amplitude of the displacement vibration has been attenuated to the predetermined setting by comparing an output from the displacement vibration detector with a threshold. The threshold for defining the predetermined setting should be determined in advance by testing. For example, the threshold is determined so as to detect a state in which the amplitude of the displacement vibration has been attenuated enough for the electric actuator to demonstrate its capability. When performing active control to suppress displacement vibrations in two or more axial directions, respective thresholds for the displacement vibrations in two or more axial directions may of course be changed according to the magnitude of the displacement vibration in each axial direction.

In performing the active control in addition to vibration suppression control or jerk control of the servomotor by the positioning servo device, the active controller may be configured to determine that the amplitude of the displacement vibration can be considered as having been attenuated to the predetermined setting, when a predetermined timer period elapses from a predetermined point of operation in the positioning control by the servomotor. In this case, the timer period can also be determined in advance by testing. Alternatively, the timer period may appropriately be set on-site by an administrator of the apparatus for taking out a molded product.

The predetermined point of operation is preferably a starting point of the positioning control by the servomotor, a point at which a completion command is outputted, or before or after the completion command is outputted. For actual setting of the timer period, the apparatus preferably includes a timer period adjusting section operable to adjust the timer period.

The active controller may be configured to determine that the amplitude of the displacement vibration can be considered as having been attenuated to the predetermined setting, when any one of signals is outputted from a molding machine, indicating that an ejector has retracted to a retraction position, or that the ejector should start ejection, or that a molding die is in an opening motion, or that the molding die has completed opened, or that the molding die has completely closed. These signals are outputted from the molding machine after the positioning control by the servomotor has started but before a completion command is outputted. These signals outputted from the molding machine can be used as the start time of the active controller. The use of these signals as the start time of operation will eliminate the need of performing special signal processing or providing a timer for setting the point of time for starting active control. This simplifies the configuration of the active controller.

When it is necessary to position the take-out head after the take-out head has taken out a molded product from the molding die, the active controller may be configured to determine that the amplitude of the displacement vibration can be considered as having been attenuated to the predetermined setting, based on a signal outputted from peripheral equipment of the apparatus for taking out a molded product. In this configuration, the active control can effectively be utilized for not only take-out motion but also direction-change motion and opening motion.

When the displacement vibration detector is configured to output a motor current signal of the servomotor or a torque signal of the servomotor, or a signal proportional to the motor current signal or the torque signal as a displacement vibration detection signal indicative of the detected displacement vibration, the active controller may be configured to determine that the amplitude of the displacement vibration can be considered as having been attenuated to the predetermined setting, based on the displacement vibration detection signal. When using the displacement vibration detection signal in this way, the start time of the active control can be set without installing a special sensor.

Alternatively, the active controller may be configured to determine that the amplitude of the displacement vibration can be considered as having been attenuated to the predetermined setting, based on a change in the number of digital signals or the signal width of the digital signals that are obtained when A/D conversion is performed on the displacement vibration detected by the displacement vibration detector. The effective number of digital signals or the ratio of signal width of digital signals can appropriately be determined in advance by experiments.

BRIEF DESCRIPTION OF DRAWINGS

FIG. 5 is an illustration used to explain the fundamental configuration and operation of a phase correcting section, an additional vibration detector, and a drive signal generator of FIG. 3.

DESCRIPTION OF EMBODIMENT

Now, an embodiment of the present invention will be described below in detail with reference to the accompanying drawings.

<Configuration of Apparatus for Taking Out Molded Product>

Figure 1:
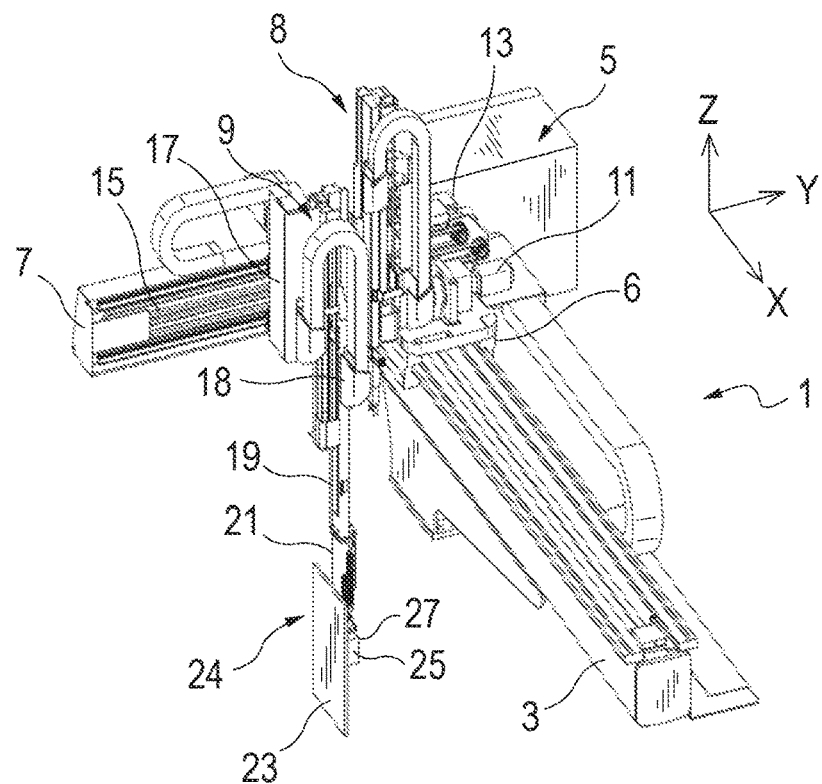
FIG. 1 illustrates an overall configuration of an apparatus for taking out a molded product according to an embodiment of the present invention.
Figure 2:
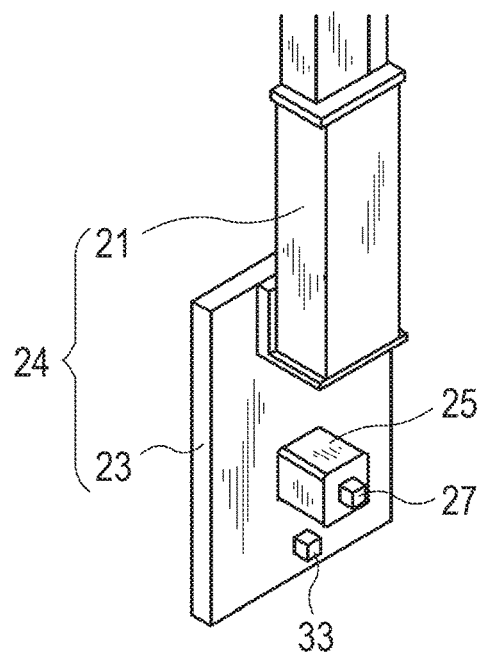
FIG. 2 is a schematically perspective view illustrating apart of an example apparatus for taking out a molded product that is equipped with an electric actuator.

FIG. 1 illustrates the overall configuration of an apparatus 1 for taking out a molded product according to an embodiment of the present invention. FIG. 2 is a schematically perspective view illustrating a part of an example apparatus for taking out a molded product that is equipped with an electric actuator. The apparatus 1 is a traverse-type apparatus for taking out a molded product. A base portion of the apparatus 1 is supported by a fixing platen of a molding machine, not illustrated. The apparatus illustrated in FIG. 1 includes a lateral frame 3, a control box 5, a first travelling body 6, a pull-out frame 7, a runner lift unit 8, and a molded product-suctioning lift unit 9. The lateral frame 3 has a cantilever beam structure in which the lateral frame 3 extends in an X direction that is horizontally orthogonal to a longitudinal direction of the molding machine, not illustrated. The first travelling body 6 is supported by the lateral frame 3, and is advanced and retracted in the X direction along the lateral frame 3 as driven by a drive source which is an AC servomotor 11 included in a servo device. The pull-out frame 7 is disposed at the first travelling body 6, and extends in a Y direction that is parallel to the longitudinal direction of the molding machine. The molded product-suctioning lift unit 9 is supported by the pull-out frame 7 to be movable in the Y direction as driven by a drive source which is an AC servo motor 13 included in the positioning servo device. In the present embodiment, a second travelling body 17, which is included in the molded product-suctioning lift unit 9 and supported by the pull-out frame 7 to work as a base, moves in the Y direction as a belt 15 is driven to rotate by the servomotor 13. In the present embodiment, the second travelling body 17 is caused to move by a belt transport mechanism using the belt 15. A rope may be used as a force transport means in place of the belt transport mechanism.

The molded product-suctioning lift unit 9 includes a lift frame 19 operable to move up and down in a Z direction as an approach frame as driven by a drive source 18, a reverse unit 21 operable to rotate centering on a frame line of the lift frame 19, and a take-out head 23 provided at the reverse unit 21 as an attachment. In the present embodiment, the reverse unit 21 and the take-out head 23 constitute a take-out mechanism 24. If the reverse unit 21 is not provided, only the take-out head 23 constitutes the take-out mechanism 24. Further, in the present embodiment, an electric actuator 25, which includes an excitation coil and a mover provided with a permanent magnet and operable to be driven by the excitation coil, is attached to the take-out head 23. The mover of the electric actuator 25 is attached with a first acceleration sensor 27. In theory, the mounting position of the electric actuator 25 is not limited to the take-out head 23.

It is a matter of course that the electric actuator 25 may be mounted on the reverse unit 21, the lift frame 19, or the second travelling body 17.

<Configuration of Active Controller>

Figure 3:
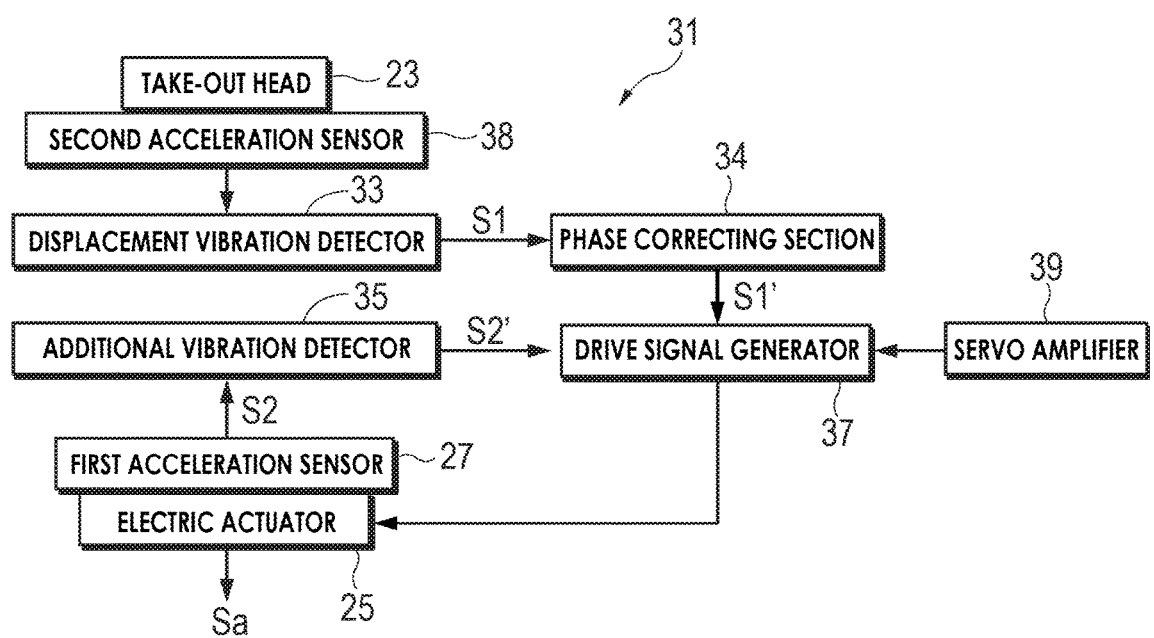
FIG. 3 is a block diagram illustrating an example configuration of an active vibrator.

The apparatus 1 according to the present embodiment includes an active controller 31 illustrated in FIG. 3 in a control section, not illustrated in FIG. 1. The active controller 31 includes a displacement vibration detector 33, a phase correcting section 34, the electric actuator 25 to be attached to the take-out head 23 for suppressing the vibration of the take-out head 23 in the horizontal or vertical direction, an additional vibration detector 35, and a drive signal generator 37.

The electric actuator 25 may be of any structure, provided that the actuator is capable of applying vibration of any power and any frequency to the take-out head within the capability of the actuator. In the present embodiment, an electromagnetic actuator manufactured by Sinfonia Technology Co., Ltd. under the product number of RM040-021 is used. In the present embodiment, since the take-out mechanism 24 is constituted from the reverse unit 21 mounted on the lift frame 19 and take-out head 23 attached to the reverse unit 21, the electric actuator 25 is mounted on the take-out head 23 as discussed above. This is because the reverse unit 21 has predetermined rigidity, and therefore can effectively suppress the vibration. In order to suppress the vibration as caused in the horizontal direction, the electric actuator 25 should be mounted to generate a vibration in the horizontal direction. In order to suppress the vibration as caused in the vertical direction, the electric actuator 25 should be mounted to generate a vibration in the vertical direction. The present invention may, of course, be applied to the configuration in which a plurality of electric actuators are used to suppress vibrations caused in a plurality of axial directions.

Figure 4A:
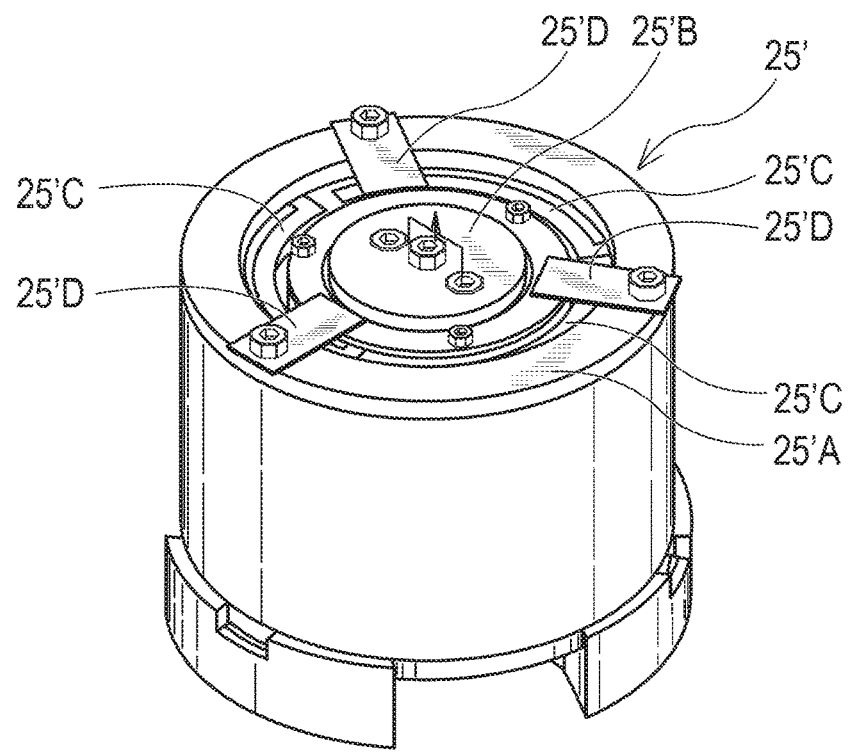
FIGS. 4A and 4B are a perspective view and a cross sectional view, respectively, of an example electric actuator applicable to the embodiment of the present invention.
Figure 4B:
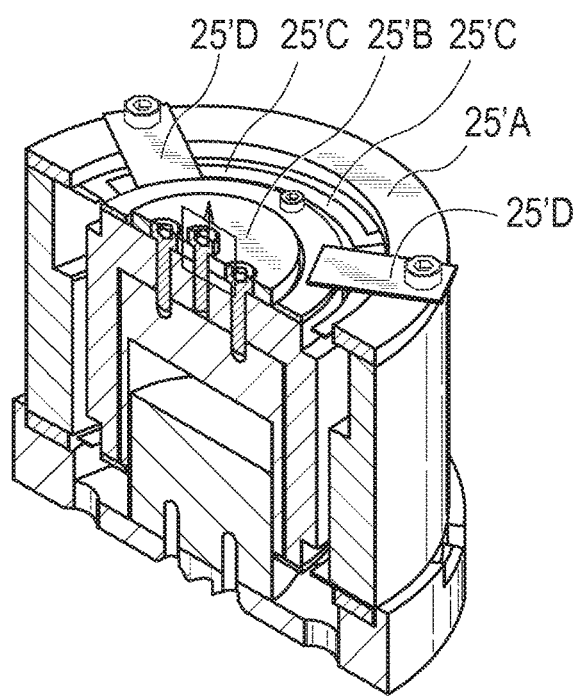

FIGS. 4A and 4B are a perspective view and a cross sectional view, respectively, of an example electric actuator 25' applicable to the present embodiment. The electric actuator 25' includes a cylindrical stator 25'A and a mover 25'B disposed in a central portion of the stator 25'A and supported by three plate springs 25'C on the stator 25'A. The movable range of the mover 25'B is regulated by a stopper 45'D. The electric actuator 25' operates on the same principles as a so-called cylindrical linear motor. The stator 25'A is fixed onto the take-out head 23 and the vibration of the mover 25'B is transmitted to the stator 25'A, thereby performing the active control. The afore-mentioned acceleration sensor 27 is attached to the mover 25'B.

The displacement vibration detector 33 outputs a displacement vibration detection signal S1 including information on a displacement vibration frequency component proportional to the displacement vibration of the take-out head 23 in the horizontal direction, based on an output from a second acceleration sensor 38 attached to the take-out head 23. The displacement vibration includes a plurality of vibration frequency components based on first-order vibration, second-order vibration, and so forth caused by motions of the lift frame 19 and the take-out head 23. The vibration frequency components included in the displacement vibration are varied depending on the structure of a belt transport mechanism or a rope transport mechanism that is provided between the servomotor 13 and the lift frame 19. The take-out mechanism 24 of the apparatus for taking out a molded product needs to get into between two molding dies of the molding machine. For this reason, the electric actuator used should be light in weight and small in size in order to suppress the vibration of the take-out head 23 by the electric actuator 25 attached to the take-out mechanism 24.

As the displacement vibration detector 33, a vibration sensor other than the acceleration sensor or a vibration detector such as a laser displacement gauge may be used.

<Details on Active Controller>

In the present embodiment, also when a light and small-sized electric actuator is used, the positioning control, vibration suppression control, and/or jerk control by the servomotor are jointly used with the active control in order to make the most of the vibration suppressing capability of the electric actuator. In the present embodiment, the positioning control by the servomotor and the active control by the active controller are jointly used. FIG. 5 is an illustration used to explain the fundamental configuration and operation of a phase correcting section 34, an additional vibration detector 35, and a drive signal generator 37 of FIG. 3. In FIG. 5, for ease of understanding, the positioning control by the servomotor is not performed and only the active control is performed. The joint use of the positioning control by the servomotor and the active control by the active controller will be discussed later.

The phase correcting section 34 corrects a phase shift of the displacement vibration detection signal S1 outputted from the displacement vibration detector 33 that has received an output from the second acceleration sensor 38, based on phase shift information that has been obtained in advance, and generates a corrected displacement vibration detection signal S1'. A phase shift occurs between the displacement vibration detection signal S1 and the actual displacement vibration due to various factors such as the configuration of the displacement vibration detector 33. In the apparatus for taking out a molded product, the respective shapes and weights of the take-out head and a molded product to be taken out do not change once they are set. Therefore, the phase shift can be obtained in advance by performing prior measurement before the take-out operation is started. Then, in the present embodiment, the phase shift of the displacement vibration detection signal S1 is corrected based on the predetermined phase shift information and the corrected displacement vibration detection signal S1' is generated, thereby preventing vibration from being caused due to the phase shift.

The additional vibration detector 35 receives an output from the first acceleration sensor 27 as an input; detects additional vibration as caused in the horizontal direction and generated by the electric actuator 25; and outputs an additional vibration detection signal S2' including information on an additional vibration frequency component of the additional vibration. If vibration suppressing operation is performed by causing the electric actuator 25 to operate using only the corrected displacement vibration detection signal S1', an additional vibration frequency component of the electric actuator 25 in the horizontal direction is included in the displacement vibration frequency component. If the additional vibration frequency component is not taken into consideration, however, the vibration cannot be quickly suppressed using the electric actuator 25 without causing oscillation. In the present embodiment, the additional vibration detector 35 is constituted from an acceleration sensor 27 attached to a mover of the electric actuator 25 and operable to detect an acceleration of the mover. Currently, a semiconductor acceleration sensor, for example, may be used as the first and second acceleration sensors 27 and 38. Semiconductor acceleration sensors sized to be attachable to the mover are commercially available. In the present embodiment, an acceleration sensor available from Kionix, Inc. under the product name of KXR94-2050 is used.

The drive signal generator 37 generates a drive signal required for active control of the electric actuator 25 so as to suppress the vibration of the take-out head 23 of the take-out mechanism 24 as caused in the horizontal direction, based on the displacement vibration frequency component included in the corrected displacement vibration detection signal S1' and the additional vibration frequency component included in the additional vibration detection signal S2'. Only with a drive signal for driving the actuator that is generated based only on the displacement vibration detection signal S1 including information on the displacement vibration frequency component, vibration may not be fully suppressed in some cases. This is because the additional vibration (additional vibration frequency component) generated by vibration of the actuator is included in the displacement vibration frequency component. Then, a drive signal Sa is used. The drive signal Sa is obtained as follows: the corrected displacement vibration detection signal S1' is obtained by correcting the phase of the detection signal S1 including information on the displacement vibration frequency component; the additional vibration detection signal S2' is proportional to the speed obtained by integrating an acceleration signal S2 from the acceleration sensor 27 including information on the additional vibration frequency component due to the additional vibration of the vibrator of the electric actuator 25 operable to generate a vibration for suppressing vibration of the take-out head 23 as caused in the horizontal direction; and the additional vibration detection signal S2' is removed from the corrected displacement vibration detection signal S1'. Consequently, it is possible to increase attenuation of the additional vibration to prevent oscillation, thereby making the active control using the electric actuator 25 more effective. As a result, it is possible to reliably suppress the vibration of the take-out head 23 in a shorter time compared to the prior art.

FIG. 5 illustrates, together with waveforms, the configuration and process of generating the drive signal Sa for the electric actuator 25 when only active control is performed by using the electric actuator 25 to suppress vibration without performing positioning control by the servomotor for vibration suppression. As illustrated in FIG. 5, the drive signal generator 37 includes a first gain adjusting section 37A, a second gain adjusting section 37B, and a computing section 37C. The first gain adjusting section 37A adjusts the gain of the corrected displacement vibration detection signal S1' outputted from the phase correcting section 34. The second gain adjusting section 37B adjusts the gain of the additional vibration detection signal S2' outputted from the additional vibration detector 35. The first gain adjusting section 37A and the second gain adjusting section 37B enable computation by adjusting the difference in dimension and amplitude between the corrected displacement vibration detection signal S1' and the additional vibration detection signal S2'. The computing section 37C executes computation to remove the additional vibration detection signal S2', which has been subjected to the gain adjustment, from the corrected displacement vibration detection signal S1' which has been subjected to the gain adjustment in order to reduce or remove the effect due to the additional vibration frequency component generated by the additional vibration of the actuator and included in the displacement vibration frequency component. If the polarity of the output from the acceleration sensor 27 is negative, the computing section 37C performs an addition. When jointly using the positioning control by the servomotor and the active control by the active controller, the computing section 37C has a function of determining the start time for making the most of active control. In the example illustrated in FIG. 5, this function is not used.

It is preferred that the active controller 31 is constantly in operation when the molding machine is operating. With this, the vibration of the take-out head 23 is constantly suppressed and a molded product can be taken out without being deformed. Thus, it is possible to prevent the molded product, which has been taken out and has not been completely cured, from being deformed. As far as the active controller 31 is in operation at least when the take-out head 23 stops its motion in a molding die, the take-out head 23 can quickly and reliably perform the take-out motion of the molded product.

Further, the active controller 31 may be in operation when the take-out head 23 stops its motion at the product releasing position or to change its moving direction. With this, it is possible to prevent the molded product which has not completely been cured from being deformed.

<Joint Use of Positioning Control by Servomotor and Active Control>

In the present embodiment, the positioning control by the servomotor and the active control by the active controller are jointly employed. If the output of an electric actuator is not so large, the active control may be performed at the same time or before the positioning control by the servomotor is started. However, if the output of the electric actuator becomes large, there may be raised a problem with the joint use of the positioning control and the active control from the initial phase of vibration suppression. Then, in the present embodiment, the active controller 31 carries out positively active control after the amplitude of displacement vibration of the take-out head 23 has been attenuated to the predetermined setting by the positioning control by the servomotor or the amplitude can be considered as having been attenuated to the predetermined setting by the positioning control by the servomotor. The positioning control by the servomotor is a control function that is generally installed in a commercially available servo amplifier 39. When a stop command is outputted, the positioning control function performs positioning while suppressing vibration of the drive frame of the servomotor. Generally, the commercially available servo amplifier 39 is provided with a vibration suppression function of suppressing the vibration having a predetermined frequency and a jerk control function of suppressing the acceleration change rate within a predetermined range. The servo amplifier 39 is configured to output a completion command once positioning has been completed.

In some cases where a belt transport mechanism to be driven by the servomotor 13 is employed, the vibration of the take-out head 23 cannot be suppressed in a short time only with the positioning control by the servomotor. For this reason, the active control by the active controller 31 is used jointly with the positioning control by the servomotor. In the present embodiment, when taking out a molded product, the displacement vibration of the take-out head 23 is suppressed by causing the electric actuator 25 to apply to the take-out head 23 a vibration having an antiphase to the displacement vibration detected by the displacement vibration detector 33. In the present embodiment, the active controller 31 carries out positively the active control after the amplitude of the displacement vibration of the take-out head 23 has been attenuated to the predetermined setting by means of the positioning control by the servomotor or when the amplitude can be considered as having been attenuated to the predetermined setting. In the above arrangement, specifically, the positioning control is first performed by the servomotor, and then the active control is positively performed by the active controller using the electric actuator 25. Therefore, an electric actuator, which is light in weight and small in size, can be employed. Of course, the active control can be performed not only at the time of taking out a molded product but also at any time while performing the positioning control by the servomotor.

Specifically, when the positioning control by the servomotor and the active control by the active controller are jointly used, the active controller 31 starts positively performing the active control after the amplitude of the displacement vibration of the take-out head 23 has been attenuated to the predetermined setting by means of the positioning control by the servomotor or when the amplitude can be considered as having been attenuated to the predetermined setting. Before the amplitude of the displacement vibration of the take-out head 23 has been attenuated to the predetermined setting by means of the positioning control by the servomotor or the amplitude can be considered as having been attenuated to the predetermined setting, the limited active control is performed with the output lower than the maximum output of the electric actuator.

Here, it is determined based on an output from the displacement vibration detector 33 whether or not the amplitude of the displacement vibration of the take-out head 23 has been attenuated to the predetermined setting (the start time of the active control). Specifically, the computing section 37C is provided with a means for comparing an output from the first gain adjusting section 37A of FIG. 5 with a threshold corresponding to a positive or negative "predetermined setting" to generate a start timing signal indicative of the start time of the active control. This comparing means generates a start timing signal when it is determined that an output from the first gain adjusting section 37A falls within the threshold corresponding to the positive or negative "predetermined setting". Then, the computing section 37C outputs an actuator drive signal Sa in response to the start timing signal, indicating that the electric actuator should be driven. The threshold should be determined in advance by testing.

A timer means for counting a timer period may be provided in the computing section 37C and the active controller 31 may be configured to determine that the amplitude of the displacement vibration can be considered as having been attenuated to the predetermined setting, when a predetermined timer period elapses from a predetermined point of operation in the positioning control by the servomotor. The predetermined point of operation may be a starting point of the positioning control by the servomotor, a point at which a completion command is outputted, or before or after the completion command is outputted. Here again, the timer period is determined in advance by testing. To actually set the timer period, a timer period adjusting section is preferably provided to adjust the timer period. With the timer adjusting section, the timer period setting can appropriately be done on-site by an administrator for the apparatus for taking out a molded product.

The active controller 31 may include, in the computing section 37, a filter circuit operable to cut an output from the displacement vibration detector 33 (in the present embodiment, an output from the phase correcting section 34) when the amplitude of the displacement is more than the predetermined setting. While an output is coming out of the filter circuit, the computing section 37C performs computation, assuming that the amplitude of the displacement vibration can be considered as having been attenuated to the predetermined setting. The cut frequency of the filter circuit is determined in advance by testing. Here again, there is no need of providing a special sensor. If a cut frequency adjusting section operable to adjust the cut frequency is provided, versatility of the apparatus can be increased.

The active controller 31 may be configured to determine that the amplitude of the displacement vibration can be considered as having been attenuated to the predetermined setting, based on a change in the number of digital signals or the signal width of the digital signals that are obtained when A/D conversion is performed on the displacement vibration detected by the displacement vibration detector 33. The effective number of digital signals or the ratio of signal width of digital signals can appropriately be determined in advance by experiments. Means for A/D conversion, means for counting of the digital signals, and means for counting the signal width may be program implemented in the computing section 37C (such means may be provided as a program in the computing section 37C).

The displacement vibration detector 33 may be configured to output a motor current signal of the servomotor or a torque signal of the servomotor, or a signal proportional to the motor current signal or the torque signal as the displacement vibration detection signal. If the above-mentioned signals are used, the start time of the active control can be set without installing a special sensor. Specifically, as the displacement vibration detection signal S1, the displacement vibration detector 33 detects a motor current signal of the servomotor 13 in the servo device operable to move the lift frame 19 of FIG. 1 in the horizontal direction, or a torque signal of the servomotor 13, or a signal proportional to the motor current signal or the torque signal is outputted from the servo amplifier 39. Thus, information on the displacement vibration frequency components can be taken out of the signal S1. There is no need of providing a special sensor operable to detect displacement vibration in the vicinity of the take-out mechanism 24 or a molding die. In order to suppress the vibration of the lift frame 19 as caused in the vertical direction, a motor current signal or a torque signal may be obtained from an output of the servo amplifier 39 for driving a motor to move the lift frame 19 up and down, and drive the electric actuator 25 using the thus obtained signal. In this case, the mounting position of the electric actuator 25 should be changed such that the vibration generated by the electric actuator 25 may be vertical.

Figure 6A:
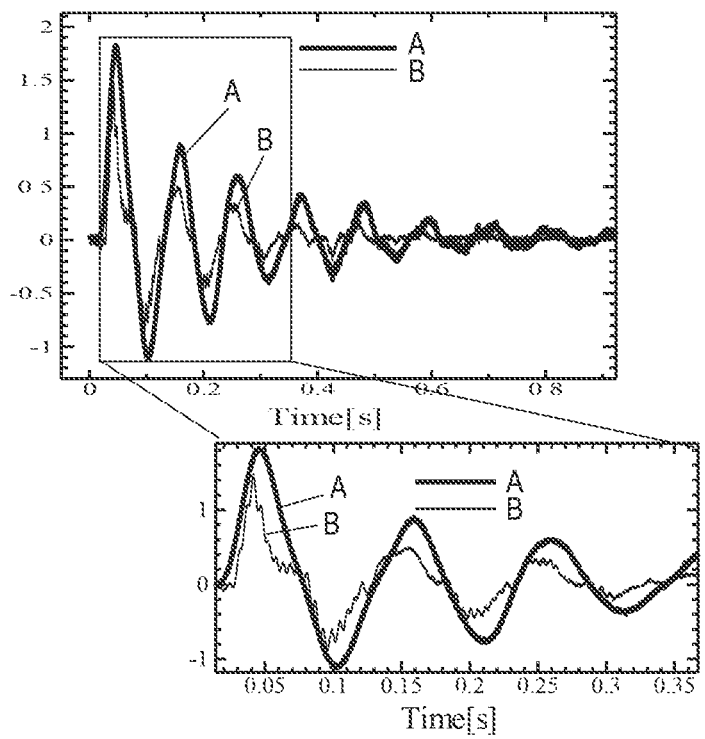
FIG. 6A is a waveform comparison chart illustrating a waveform of vibration of a take-out mechanism as measured by a laser displacement gauge when the take-out mechanism is in a take-out motion, and a waveform of a torque command outputted from a servomotor.
Figure 6B:
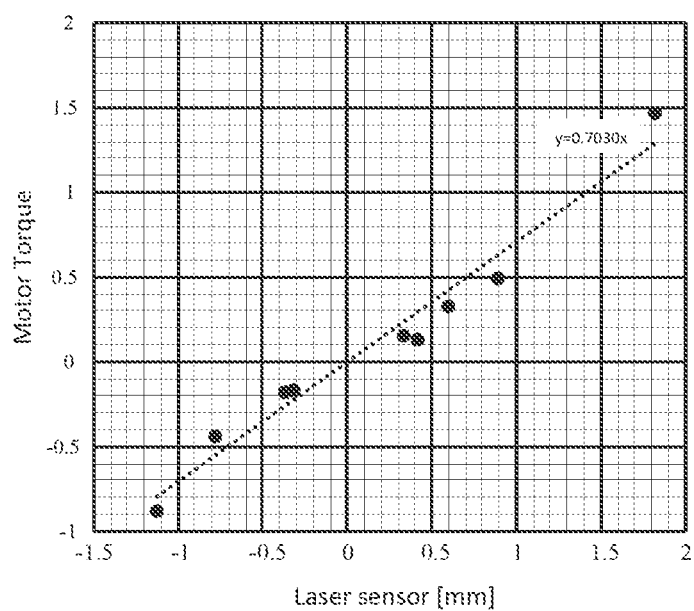
FIG. 6B illustrates the comparison results of the vibration waveform and the torque command waveform.

FIG. 6A is a waveform chart illustrating a vibration waveform A representing the vibration of the take-out mechanism 24 during pull-out operation as measured by a laser displacement gauge (available from Keyence Corporation under the product name of IL-S100) and a torque command waveform B for the servomotor 13 for comparison of waveforms A and B. The torque command waveform B was taken from a torque command output terminal of a servo amplifier available from Fuji Electric Co., Ltd. under the product name of RYT201D5-LS2-Z25. When waveform A and waveform B are compared with each other, it is found that waveforms A and B are proportional to each other as seen in terms of the peak values of the waveforms although there is a phase shift therebetween. This is illustrated in FIG. 6B. This is confirmed from the result of plotting the absolute values of points on the torque command waveform and the absolute values of outputs from the laser displacement gauge. This relationship is also found to appear for the motor current signal of the servomotor. When focus is placed on the respective first peaks and the respective second peaks of the two waveforms, it is seen that there is a shift (lead) of 0.03 to 0.04 seconds between the two waveforms.

<Results of Joint Use of Positioning Control by Servomotor and Active Control>

Figure 7:
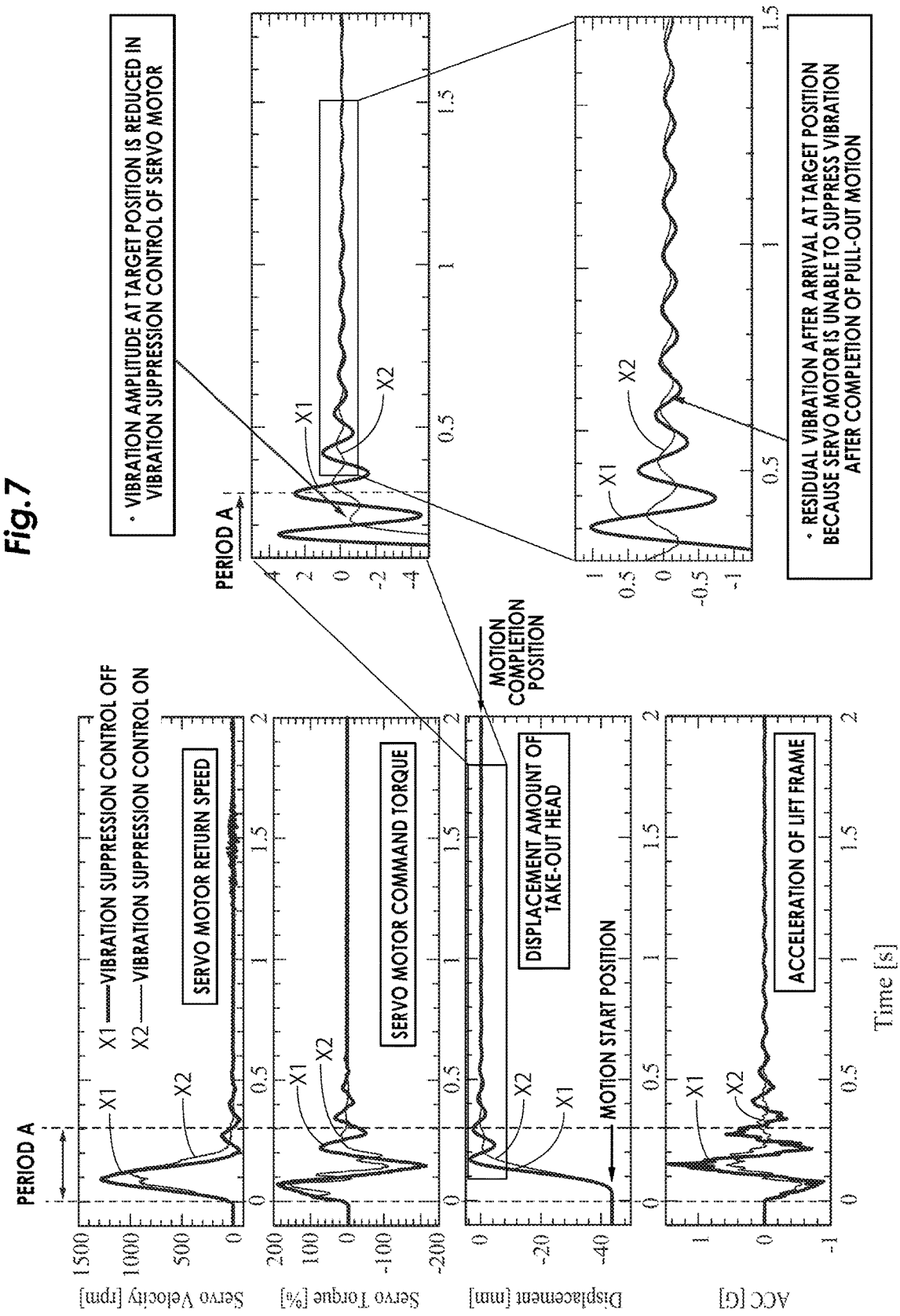
FIG. 7 illustrates waveforms of different types and partially enlarged waveforms during a period from the time that the apparatus is ready to perform pull-out operation of a molded product till the completion time of vibration suppressing operation when not performing the active control by the active controller, but performing both of the positioning control by the servomotor and vibration suppression control of the servomotor by the servo positioning device, and when not performing the active control by the active controller, but performing only the positioning control by the servomotor, not performing the vibration suppression control of the servomotor by the servo positioning device.

The effect of feedback control in the active controller used in the present embodiment was confirmed. With reference to FIGS. 7 to 10, the confirmed results will be described. First, FIG. 7 shows a comparative example. FIG. 7 illustrates waveforms of different types and partially enlarged waveforms during a period from the time that the apparatus is ready to perform pull-out operation of a molded product till the completion time of vibration suppressing operation when positioning control by the servomotor is performed without performing active control, with vibration suppression control of the servomotor being performed by the positioning servo device (as annotated with "ON") and without vibration suppression control of the servomotor being performed by the positioning servo device (as annotated with "OFF"). In FIG. 7, the waveform of "servomotor return speed" represents a feedback speed signal used for performing the positioning control by the servomotor in the feedback control. The waveform of "servomotor command torque" represents a torque command used in the feedback control. The waveform of "displacement of the head" represents a displacement of the take-out head 23 as detected from an output of the laser displacement gauge. Further, the waveform of "acceleration of the lift frame" represents an output from a third acceleration sensor (not illustrated) disposed for confirmation at the lift frame 19 and operable to detect an acceleration in the horizontal direction. In FIG. 7, the "Period A" represents a time period from the time that pull-out operation is ready at the start position till the completion of pull-out operation. "X1" represents a waveform when the positioning control by the servomotor is not performed for vibration suppression (as annotated with "OFF"). "X2" represents a waveform when the positioning control by the servomotor is performed for vibration suppression (as annotated with "ON"). As illustrated in the enlarged views, when the vibration suppression control of the servomotor is performed by the positioning servo device, the amplitude of the vibration upon arrival at a target position is reduced. After the pull-out motion has completed, however, residual vibration cannot reliably be reduced by the vibration suppression control of the servomotor by the positioning servo device.

Figure 8:
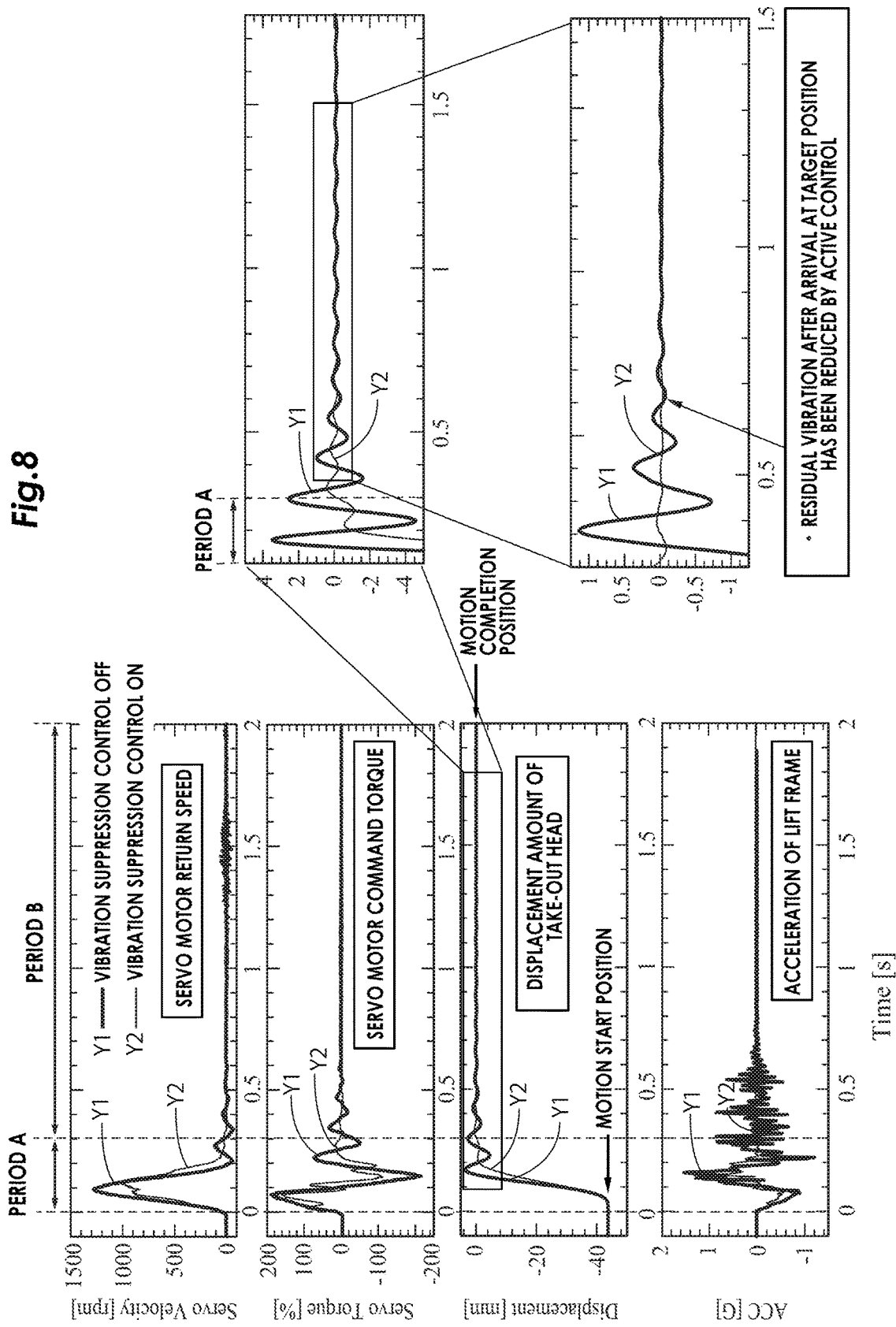
FIG. 8 illustrates waveforms of different types and partially enlarged waveforms when using both of positioning control and vibration suppression control by the servomotor, and active control by the active controller, and when using only active control by the active controller.

FIG. 8 illustrates control results in terms of waveforms of different types and partially enlarged waveforms when jointly using positioning control by the servomotor and the active control by the active controller (see waveform Y2) and when performing only the active control (see waveform Y1). In FIG. 8, "Period B" represents a period over which the active control is positively performed. In this example, at the end of "Period A", namely, upon completion of pull-out operation, the positive active control started. In the "Period A", the active control was not performed in order to clarify the effect of active control. It is known from FIG. 8 that it takes long to reduce the vibration of displacement only by the active control (see waveform Y1) while the amplitude of displacement vibration of the take-out head is large, and that the displacement vibration can quickly be reduced and the residual vibration after arrival at the target position can also be reduced when the positioning control by the servomotor and the active control by the active controller are jointly used (see waveform Y2).

Figure 9:
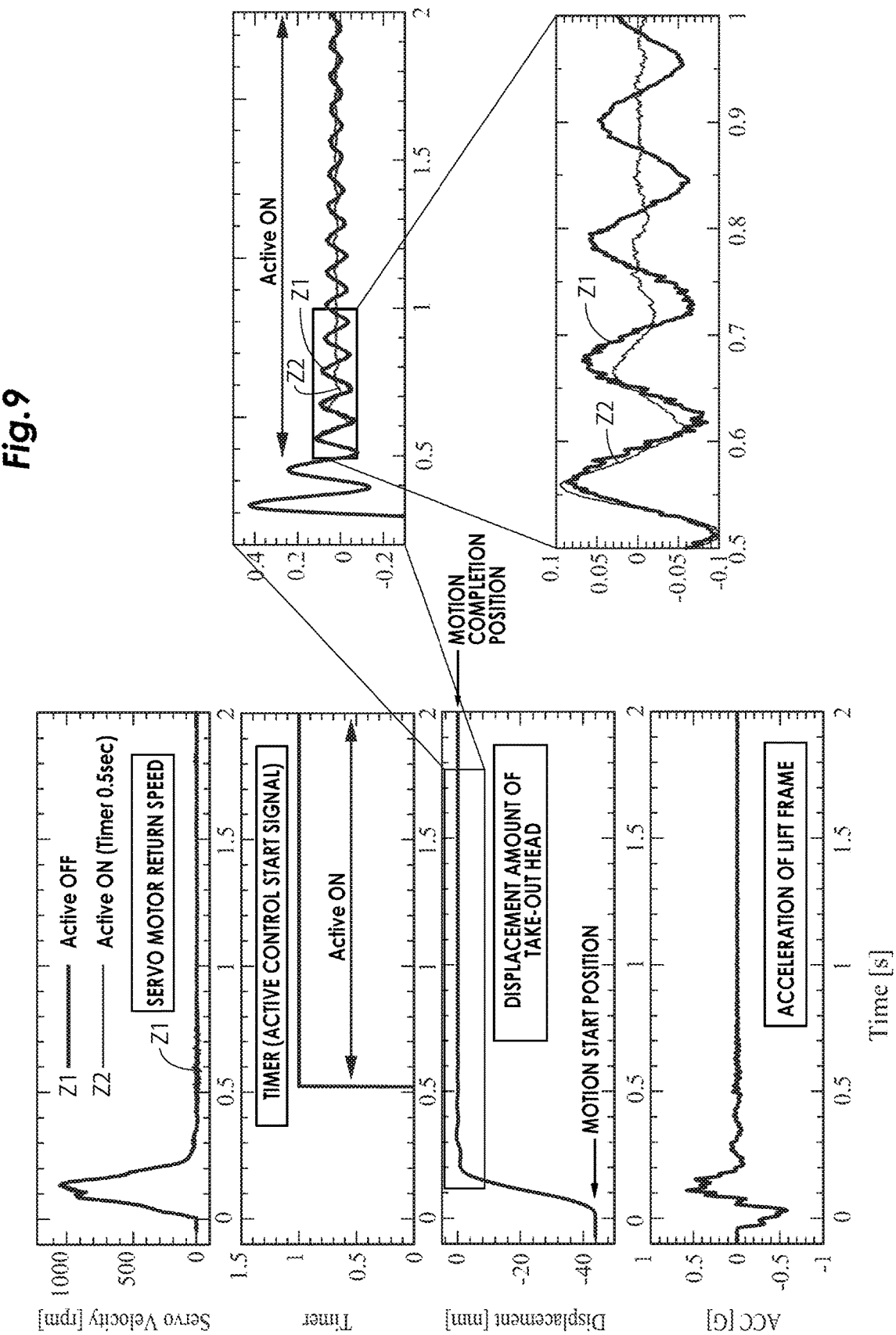
FIG. 9 illustrates waveforms of different types and partially enlarged waveforms when performing only positioning control by the servomotor and not performing the active control by the active controller and when performing positioning control by the servomotor and also performing the active control by the active controller using a timer period which determines that an amplitude of displacement vibration can be considered as having been attenuated to a predetermined setting.

FIG. 9 illustrates waveforms of different types and partially enlarged waveforms when performing only positioning control by the servomotor and not performing the active control by the active controller (see waveform Z1) and when performing positioning control by the servomotor and positively performing the active control by the active controller using a timer period (see waveform Z2). In this example, the timer period that determines the start time of the positive active control, which makes the most of the output of the electric actuator up to the maximum, is set such that the active control is started 0.5 seconds after the pull-out operation has been started. In FIG. 9, the period annotated with "Active ON" is a period over which the active control is performed. It is known from FIG. 9 that the effect of joint use of the positioning control by the servomotor and the active control by the active controller is surely obtained if the timer period is appropriately set also when the completion of counting the timer period is used as a signal for starting the active control.

Other Embodiments

In the above mentioned embodiment, the positioning control by the servomotor and the active control by the active controller are jointly employed. The commercially available servo device for the servomotor has a function of positioning control, a function of vibration suppression control to suppress the vibration having a predetermined frequency and a function of jerk control to suppress the acceleration change rate within a predetermined range. The present invention is, of course, applicable when the positioning servo device is configured to perform vibration suppression control in addition to the positioning control, when the positioning servo device is configured to perform jerk control in addition to the positioning control, or when the positioning servo device is configured to perform both vibration suppression control and jerk control in addition to the positioning control.

Figure 10:
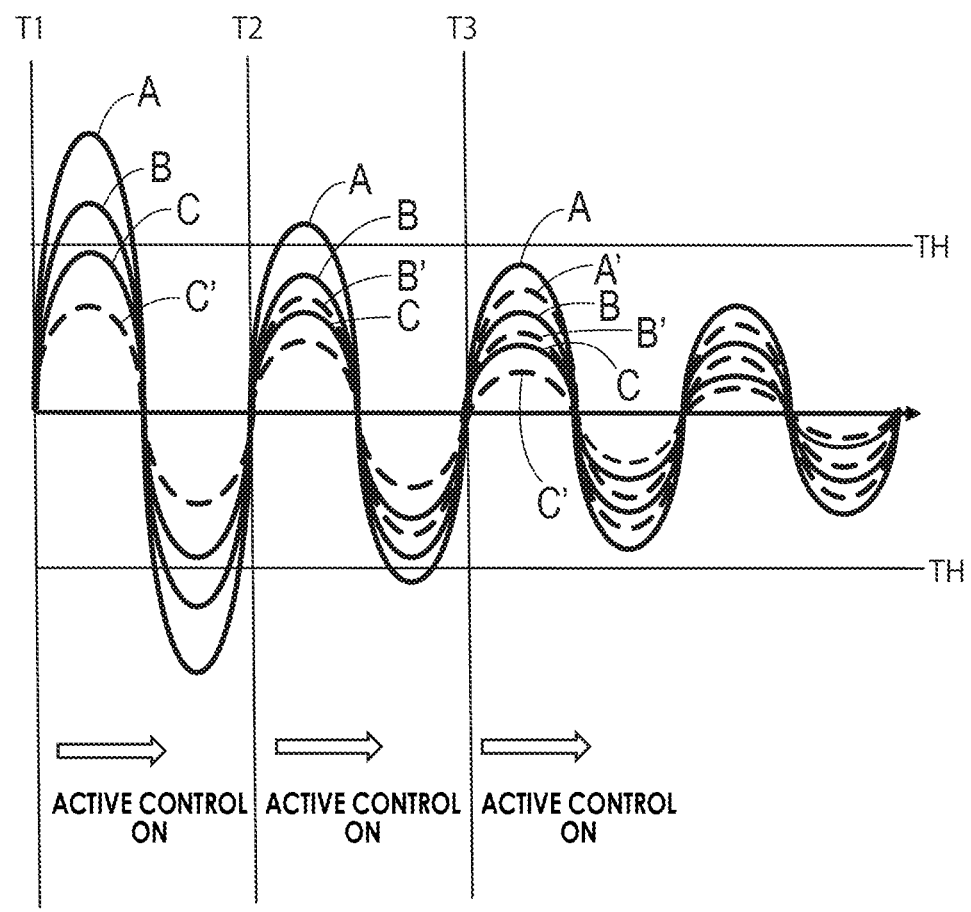
FIG. 10 illustrates conceptual waveforms of displacement vibration of a take-out head when performing not only the positioning control but also the vibration suppression control and/or the jerk control by the servo device, and the vibration suppression effect obtainable when the active control is jointly used.

In FIG. 10, waveform A simulates the displacement vibration of the take-out head when only the positioning control is performed by the positioning servo device; waveform B simulates the displacement vibration of the take-out head when the positioning control and vibration suppression control are jointly performed by the positioning servo device; and waveform C simulates the displacement vibration of the take-out head when the positioning control, vibration suppression control, and jerk control are jointly performed by the positioning servo device. In FIG. 10, TH denotes a threshold for determining the start time of the positive active control. In this example, the active control should be positively started when it is determined that the amplitude has been attenuated below the threshold TH by comparing the respective amplitudes of waveforms A to C with the threshold TH. Waveform A' simulates the displacement vibration of the take-out head assuming that the active control is positively started at time T3 after the positioning control has been performed by the positioning servo device. Waveform B' simulates the displacement vibration of the take-out head assuming that the active control is positively started at time T2 after the positioning control and vibration suppression control have been performed by the positioning servo device. Waveform C' simulates the displacement vibration of the take-out head assuming that the active control is positively started at time T1 after the positioning control, vibration suppression control, and jerk control have been performed by the positioning servo device. It is known from these waveforms that it is effective to use the active control jointly with the various control functions of the positioning servo device. Especially by comparing waveforms A to C with waveforms A' to C', it can be known that the joint use of the active control with the positioning control, vibration suppression control, and jerk control of the positioning servo device can suppress the displacement vibration quickly. It follows from the foregoing that the active control can be effectively performed even using a small-sized electric actuator. Before the amplitude of the displacement vibration of the take-out head 23 has been attenuated to the predetermined setting by means of the positioning control, vibration suppression control, and/or jerk control by the servomotor or the amplitude can be considered as having been attenuated to the predetermined setting, the limited active control may be performed with the output lower than the maximum output of the electric actuator.

Figure 11:
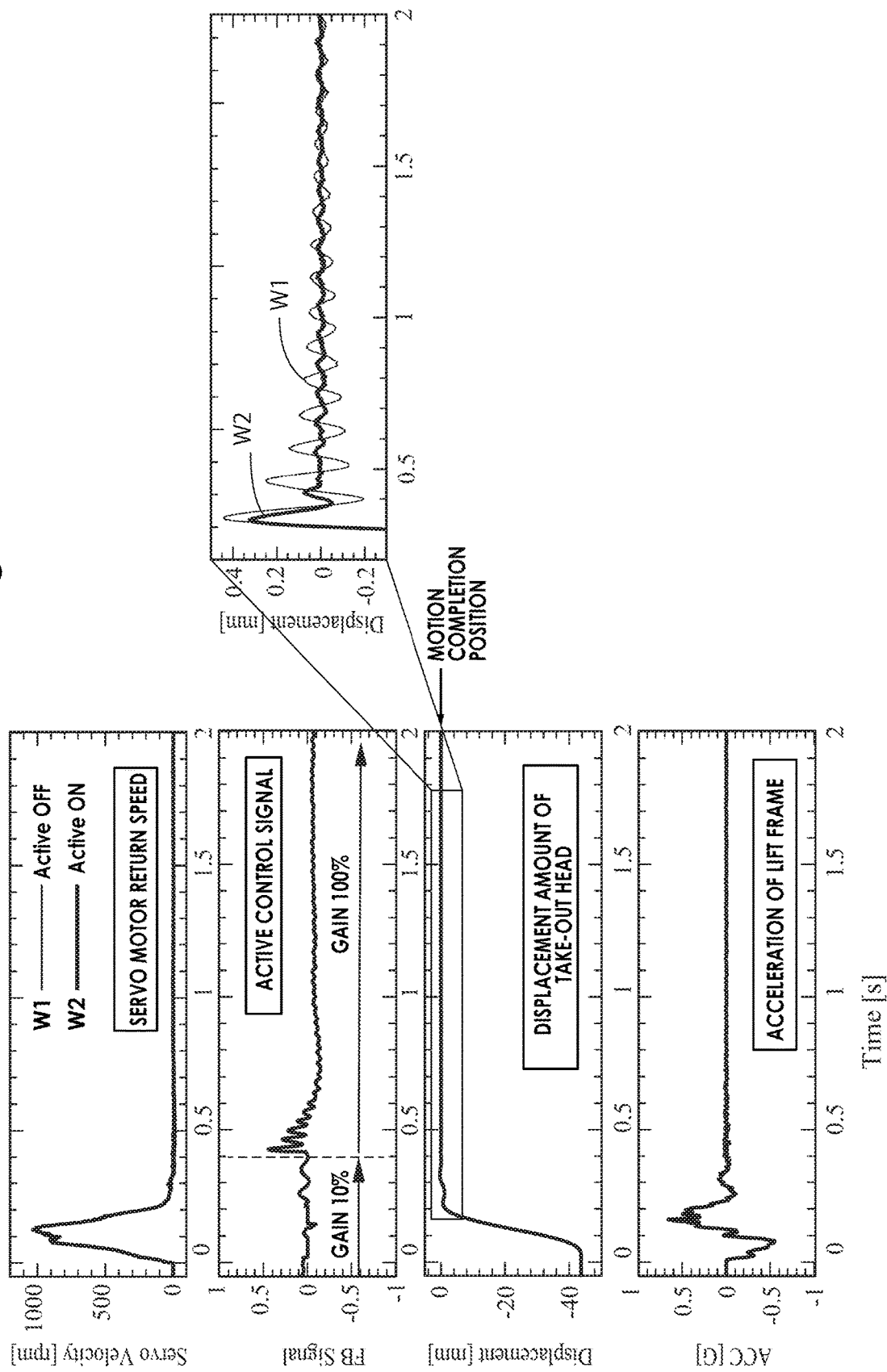
FIG. 11 is a waveform chart used to explain the operation of vibration suppression, wherein the gain of a drive signal generator is set to 10% until t=0.4 sec. right after the first occurrence of the amplitude of the return speed of the servomotor, and then is set to 100% after t=0.4 sec.

In the present embodiment, the active control is started along with the positioning control by the servomotor. In this configuration, however, the active control is performed with the output lower than the maximum output of the electric actuator until the amplitude of the displacement vibration of the take-out head 23 has been attenuated to the predetermined setting by means of the positioning control, vibration suppression control, and/or jerk control by the servomotor or when the amplitude can be considered as having been attenuated to the predetermined setting. FIG. 11 is a waveform chart used to explain the operation of vibration suppression, wherein the gain of an active control output (an actuator drive signal) of the drive signal generator 37 is set to 10% until t=0.4 sec. right after the first occurrence of the amplitude of the return speed of the servomotor, and then is set to 100% after t=0.4 sec.

In an example illustrated in FIG. 11, waveform W1 represents a displacement amount of the take-out head from the starting point of positioning control by the servomotor till the turning off of the active control (as annotated with "OFF"). Waveform W2 represents a displacement amount of the take-out head from the starting point of positioning control by the servomotor till the turning on of the active control (as annotated with "ON"). In this example, when the active control is set to OFF (see waveform W1), only the positioning control is performed by the servomotor from the beginning to the end. From comparison of waveform W1 (the active control is set to OFF) with waveform W2 (the active control is set to ON), it can be known that the time required for vibration suppression can significantly be reduced by jointly using the positioning control by the servomotor and the active control by the active controller from the starting point of positioning control by the servomotor till t=0.4 sec. right after the first occurrence of the amplitude of the servomotor's return speed. If the gain is increased too much till t=0.4 sec. right after the first occurrence of the amplitude of the servomotor's return speed, the positioning control by the servomotor may adversely be affected.

In this example, since the active control is started together with the positioning control by the servomotor, vibration suppression control can smoothly be transferred from the positioning control by the servomotor to the active control by the active controller. As a result, it becomes possible to smoothly suppress the displacement vibration of the take-out head in a shorter time than ever using an electric actuator which is light in weight and small in size. The "lower output" is preferably determined not to adversely affect the positioning control by the servomotor. The active controller is preferably configured to increase the output of the electric actuator gradually or stepwisely from the lower output. This can prevent adverse effect from being given to the vibration suppression at the beginning phase of the active control.

Figure 12:
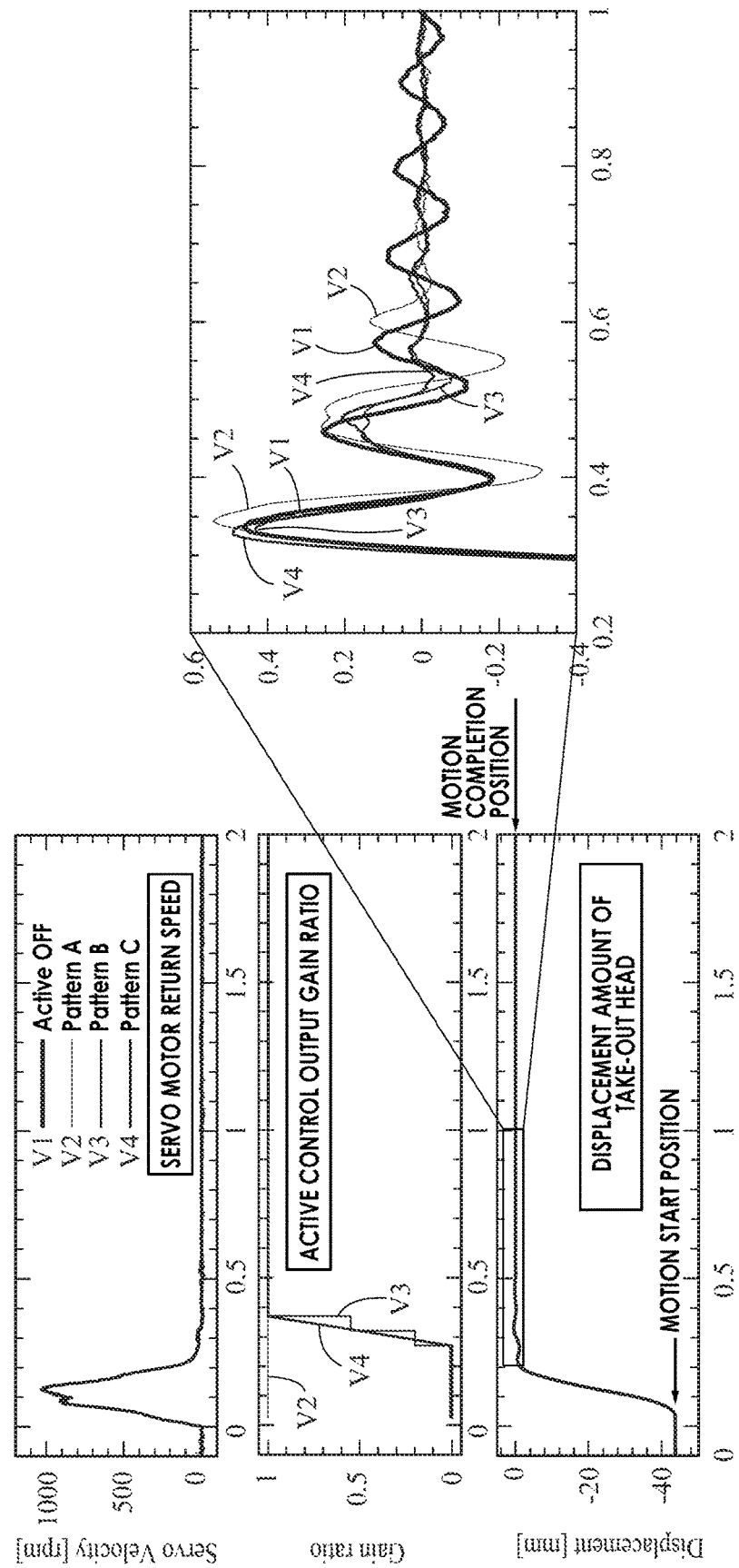
FIG. 12 is a waveform chart illustrating testing results of three different patterns where output conditions for active control are varied when the active control is performed for vibration suppression without performing the positioning control by the servomotor.

FIG. 12 is a waveform chart illustrating testing results of three different patterns where output conditions for active control are varied when performing the active control for vibration suppression without performing the positioning control by the servomotor. Pattern A represents active control which is performed with the maximum output (rated output) of 100% from the beginning. Pattern B represents active control which is performed by stepwisely increasing the output from 1%, 20%, 55% to 100%. Pattern C represents active control which is performed by gradually increasing the output continuously from 0% to 100%. Waveform V1 is a waveform as the active control is not performed. Waveform V2 is a waveform corresponding to the active control of Pattern A. Waveform V3 is a waveform corresponding to the active control of Pattern B. Waveform V4 is a waveform corresponding to the active control of Pattern C. From comparison of the waveforms, it can be known that the initial amplitude of vibration is increased in case of Pattern A where the active control is performed with an output of 100% from the beginning, thereby adversely affecting the attenuation of vibration. In contrast, if the output is increased stepwisely in Pattern B or the output is gradually continuously increased in Pattern C, the attenuation of vibration is quicker than in Pattern A.

Further, the active controller is configured to determine that the amplitude of the displacement vibration can be considered as having been attenuated to the predetermined setting, when each of signals is outputted from a molding machine, indicating that an ejector has retracted to a retraction position, or that the ejector should start ejection, or that a molding die is in an opening motion, or that the molding die has completely opened, or that the molding die has completely closed. These signals are outputted after the positioning control by the servomotor is started and before a completion command is outputted. Thus, these signals can be utilized as the start time of the active controller. If these signals transmitted from the molding machine to the apparatus for taking out a molded product are used as the start time of the active control, there is no need of performing special signal processing for timing setting and providing a timer or the like. The configuration of the active controller can be simplified.

Figure 13:
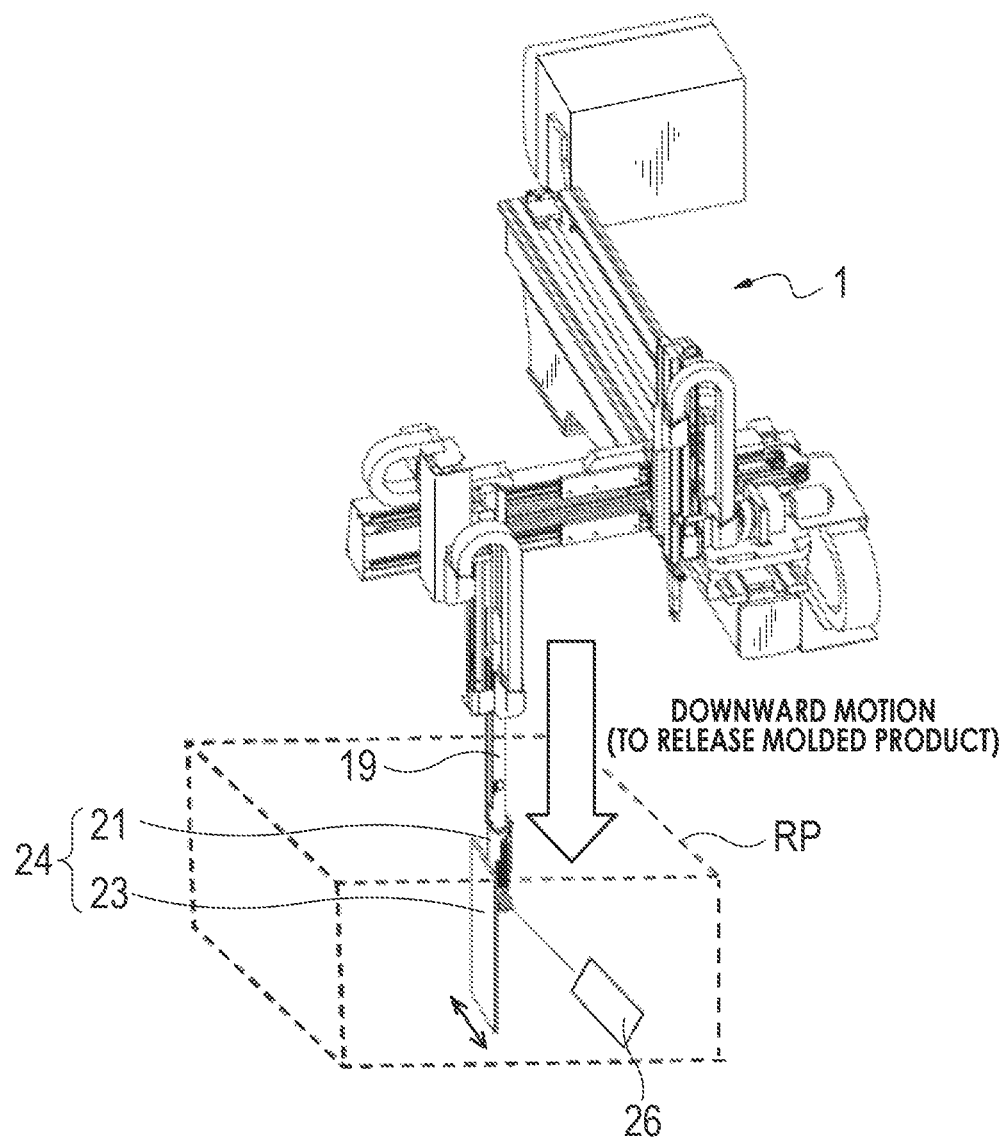
FIG. 13 is an illustration used to explain an operating state in which the take-out mechanism stops its motion at a releasing position of the molded product.

As illustrated in FIG. 13, the active controller 31 may be in motion when the take-out mechanism 24 stops its motion at a position RP for releasing a molded product. With this, it is possible to prevent the molded product, which has not been completely cured, from being deformed. At the position RP for releasing a molded product, a displacement sensor 26 may be provided to detect the vibration of lateral displacement as the take-out mechanism 24 moves to generate vibration in a moving direction orthogonal to the right-and-left direction and the up-and-down direction. In this case, the active controller 31 may be configured to perform the active control such that another electric actuator 26 (not illustrated) is attached to the take-out mechanism 24 to suppress lateral displacement vibration, based on an output from the displacement sensor 26. With this, most of the vibrations added to the molded product can be suppressed at the time of releasing the molded product

INDUSTRIAL APPLICABILITY

According to the present invention, since at least positioning control by the servomotor and the active control by the active controller are jointly employed, the displacement vibration of the attachment can be suppressed in a shorter time than ever. Further, compared with when only the active control is performed for vibration suppression, an electric actuator that is lighter in weight and smaller in size can be used when the positioning control by the servomotor and the active control by the active controller are jointly employed.

What is claimed is:

1. An apparatus for taking out a molded product, comprising:
   a positioning servo device using a servomotor;
   an approach frame controlled by the positioning servo device and having an attachment mounted thereon;
   a displacement vibration detector operable to detect a displacement vibration of the attachment; and,
   an active controller including an electric actuator and configured to perform active control to suppress the displacement vibration of the attachment by causing the electric actuator to apply to the attachment a vibration having an antiphase to the displacement vibration detected by the displacement vibration detector, wherein:
   the active controller performs the active control in conjunction with at least positioning control performed by the positioning servo device; and
   the active controller performs limited active control with a lower output than a maximum output from the electric actuator until an amplitude of the displacement vibration has been attenuated to a predetermined setting.

2. The apparatus for taking out a molded product according to claim 1, wherein
   the positioning servo device is configured to perform the positioning control and vibration suppression control.

3. The apparatus for taking out a molded product according to claim 2, wherein:
   the approach frame is a lift frame provided at a pull-out frame;
   the attachment is a take-out head attached to a leading end of the lift frame; and
   the active control is performed when the pull-out frame is driven to make a pull-out motion.

4. The apparatus for taking out a molded product according to claim 1, wherein
   the positioning servo device is configured to perform the positioning control and jerk control.

5. The apparatus for taking out a molded product according to claim 4, wherein:
   the approach frame is a lift frame provided at a pull-out frame;
   the attachment is a take-out head attached to a leading end of the lift frame; and
   the active control is performed when the pull-out frame is driven to make a pull-out motion.

6. The apparatus for taking out a molded product according to claim 1, wherein
   the positioning servo device is configured to perform the positioning control and both of vibration suppression control and jerk control.

7. The apparatus for taking out a molded product according to claim 6, wherein:
   the approach frame is a lift frame provided at a pull-out frame;
   the attachment is a take-out head attached to a leading end of the lift frame; and
   the active control is performed when the pull-out frame is driven to make a pull-out motion.

8. The apparatus for taking out a molded product according to claim 1, wherein:
   the approach frame is a lift frame provided at a pull-out frame;
   the attachment is a take-out head attached to a leading end of the lift frame; and
   the active control is performed when the pull-out frame is driven to make a pull-out motion.

9. The apparatus for taking out a molded product according to claim 1, wherein:
   the active controller determines whether or not the amplitude of the displacement vibration has been attenuated to the predetermined setting by comparing an output from the displacement vibration detector with a threshold.

10. The apparatus for taking out a molded product according to claim 1, wherein:
    the displacement vibration detector is configured to output a motor current signal of the servomotor or a torque signal of the servomotor, or a signal proportional to the motor current signal or the torque signal as a displacement vibration detection signal indicative of the detected displacement vibration; and
    the active controller determines that the amplitude of the displacement vibration can be considered as having been attenuated to the predetermined setting, based on the displacement vibration detection signal.

11. An apparatus for taking out a molded product, comprising:
    a positioning servo device using a servomotor;
    an approach frame controlled by the positioning servo device and having an attachment mounted thereon;
    a displacement vibration detector operable to detect a displacement vibration of the attachment; and,
    an active controller including an electric actuator and configured to perform active control to suppress the displacement vibration of the attachment by causing the electric actuator to apply to the attachment a vibration having an antiphase to the displacement vibration detected by the displacement vibration detector, wherein:
    the active controller performs the active control in conjunction with at least positioning control performed by the positioning servo device; and,
    the active controller performs limited active control with a lower output than a maximum output from the electric actuator until an amplitude of the displacement vibration can be considered as having been attenuated to a predetermined setting.

12. The apparatus for taking out a molded product according to claim 11, wherein:
    the active controller determines that the amplitude of the displacement vibration can be considered as having been attenuated to the predetermined setting, when a predetermined timer period elapses from a predetermined point of operation in the positioning control by the servomotor.

13. The apparatus for taking out a molded product according to claim 12, further comprising:
    a timer period adjusting section operable to adjust the timer period, wherein:
    the predetermined point of operation is a starting point of the positioning control by the servomotor, a point at which a completion command is outputted, or before or after the completion command is outputted.

14. The apparatus for taking out a molded product according to claim 11, wherein:
    the active controller determines that the amplitude of the displacement vibration can be considered as having been attenuated to the predetermined setting, when a signal is outputted from a molding machine, indicating that an ejector has retracted to a retraction position, or that the ejector should start ejection, or that a molding die is in an opening motion, or that the molding die has completely opened, or that the molding die has completely closed.

15. The apparatus for taking out a molded product according to claim 11, wherein:
when it is necessary to position the take-out head after the take-out head has taken out the molded product from a molding die, the active controller determines that the amplitude of the displacement vibration can be considered as having been attenuated to the predetermined setting, based on a signal outputted from peripheral equipment of the apparatus for taking out a molded product.

16. The apparatus for taking out a molded product according to claim 11, wherein:
the active controller determines that the amplitude of the displacement vibration can be considered as having been attenuated to the predetermined setting, based on a change in a number of digital signals or a signal width of digital signals as obtained when A/D conversion is performed on the displacement vibration detected by the displacement vibration detector.

17. The apparatus for taking out a molded product according to claim 11, wherein
the positioning servo device is configured to perform the positioning control and vibration suppression control.

18. The apparatus for taking out a molded product according to claim 11, wherein
the positioning servo device is configured to perform the positioning control and jerk control.

19. The apparatus for taking out a molded product according to claim 11, wherein
the positioning servo device is configured to perform the positioning control and both of vibration suppression control and jerk control.

20. The apparatus for taking out a molded product according to claim 11, wherein:
the approach frame is a lift frame provided at a pull-out frame;
the attachment is a take-out head attached to a leading end of the lift frame; and
the active control is performed when the pull-out frame is driven to make a pull-out motion.

21. An apparatus for taking out a molded product comprising:
a belt transport mechanism or a rope transport mechanism driven by a servomotor;
a pull-out frame;
a movable base movably mounted on the pull-out frame;
a lift frame mounted on the movable base;
a take-out head attached to a leading end of the lift frame;
a displacement vibration detector operable to detect a displacement vibration of the take-out head; and
an active controller including an electric actuator and configured to perform active control to suppress a displacement vibration of the take-out head by causing the electric actuator to apply to the take-out head a vibration having an antiphase to the displacement vibration detected by the displacement vibration detector, wherein:
the active controller starts the active control in conjunction with positioning control performed by the servomotor, but performs the active control with a lower output than a maximum output from the electric actuator until an amplitude of the displacement vibration of the take-out head has been attenuated to a predetermined setting by means of the servomotor's function of positioning control and the active control.

22. The apparatus for taking out a molded product according to claim 21, wherein:
the lower output is determined so as not to affect the positioning control performed by the servomotor.

23. The apparatus for taking out a molded product according to claim 22, wherein:
the active controller gradually or stepwisely increases an output of the electric actuator from the lower output.

24. The apparatus for taking out a molded product according to claim 21, wherein:
the active controller gradually or stepwisely increases an output of the electric actuator from the lower output.

25. An apparatus for taking out a molded product comprising:
a belt transport mechanism or a rope transport mechanism driven by a servomotor;
a pull-out frame;
a movable base movably mounted on the pull-out frame;
a lift frame mounted on the movable base;
a take-out head attached to a leading end of the lift frame;
a displacement vibration detector operable to detect a displacement vibration of the take-out head; and
an active controller including an electric actuator and configured to perform active control to suppress a displacement vibration of the take-out head by causing the electric actuator to apply to the take-out head a vibration having an antiphase to the displacement vibration detected by the displacement vibration detector, wherein:
the active controller starts the active control in conjunction with positioning control performed by the servomotor, but performs limited active control with a lower output than a maximum output from the electric actuator until an amplitude of the displacement vibration can be considered as having been attenuated to a predetermined setting by means of the servomotor's function of positioning control and the active control.

26. The apparatus for taking out a molded product according to claim 25, wherein:
the lower output is determined so as not to affect the positioning control performed by the servomotor.

27. The apparatus for taking out a molded product according to claim 25, wherein:
the active controller gradually or stepwisely increases an output of the electric actuator from the lower output.

* * * * *